May 14, 1963 HSIUNG HSU 3,090,012
MICROWAVE FERRITE PARAMETRIC AMPLIFIER USING
FREQUENCY DOUBLING AND LOWER FREQUENCY PUMP
Filed July 31, 1958

INVENTOR:
HSIUNG HSU,
BY Richard V. Lang
HIS ATTORNEY.

3,090,012
Patented May 14, 1963

3,090,012

MICROWAVE FERRITE PARAMETRIC AMPLIFIER USING FREQUENCY DOUBLING AND LOWER FREQUENCY PUMP

Hsiung Hsu, Clay, N.Y., assignor to General Electric Company, a corporation of New York Filed July 31, 1958, Ser. No. 752,372
5 Claims. (Cl. 330—4.8)

The present invention relates to an amplifier adapted for the amplification of radio frequency waves and has as a particular object the provision of an improved amplifier for amplification of waves of relatively high frequencies such as those presently used for television transmission and for radar.

It is well known that at these high frequencies, thermionic devices are excessively "noisy" and often difficult to contrive for effective operation. The present invention relates to a non-thermionic amplifier of the type now referred to as a parametric amplifier and generally characterized by lower intrinsic noise levels. The term "parametric" is expressive of the fact that the amplification function arises from a parameter which is made to change under the influence of applied electric or magnetic fields. In a known parametric amplifier, a non-linear inductance is connected in circuit with a source of high frequency waves of constant amplitude and with a source of signals to be amplified. The first source is denoted the "pumping source." In addition, a resonant circuit, known as an "idling circuit" is also coupled in circuit with the non-linear inductance. The idling circuit is not otherwise coupled with any other load or source. The frequencies of the three circuits, that is to say, the pumping frequency, the signal frequency, and idling frequency are chosen such that the pumping frequency is equal to the sum of the idling and signal frequencies. Such a circuit has the unique property of exhibiting a negative resistance to the signal source, or considered from a different point of view, the ability to amplify an input signal.

The existence of a negative resistance or amplifying action in a parametric amplifier may be qualitatively explained in the following manner. The joint presence of a signal and pumping wave in the non-linear inductance gives rise to sum and difference components: $(f_p+f_s)$ and $(f_p-f_s)$, respectively, the latter term being of a frequency identically equal to $f_i$. Similarly, the joint presence of a pumping wave and an idling signal in the non-linear inductance gives rise to sum and difference components $(f_p+f_i)$ and $(f_p-f_i)$, respectively, the latter being of a frequency identically equal to $f_s$. If now we suppose an event by which $f_s$ is made to increase in magnitude, we find that the difference term $(f_p-f_s)$ also increases in magnitude, in effect increasing the energy delivered to the resonant idling circuit. The idling circuit, after momentarily absorbing the energy reapplies it to the non-linear inductance to create the second difference term $(f_p-f_i)$ which is now at signal frequency and available as a feedback term. It may be observed that in the conversions to $(f_p-f_s)$ and to $(f_p-f_i)$, the pump is required to supply a portion of the energy required to create the difference term identically equal to $f_i$ and $f_s$, respectively. The conversions usually occur with a conversion gain well in excess of unity. In general, the effect of the abstraction of energy from the pump and the presence of feedback combine to achieve an eventual reinforcement or amplification of the signal. If the dissipation terms are small, the system will oscillate, or if of somewhat larger size, the system will exhibit a stable gain at signal frequency.

A somewhat more quantitative treatment of parametric amplification is given in the RCA Review of December, 1957, pages 578 to 593 in an article entitled "Theory of Parametric Amplification Using Non-Linear Reactances" by S. Bloom and K. K. Chang.

At this point one might observe that there are certain practical difficulties in the operation of known parametric amplifiers. For efficient operation, it is necessary that a large supply of pumping energy be available. This requirement has been considerably difficult to meet especially when coupled with the requirement that the frequency of the pumping energy be considerably higher than the signal frequency. In general, it is more difficult to achieve high energy pumping as the frequency is increased. It is accordingly an object of the present invention to provide a parametric amplifier wherein the operating frequency of the effective pumping source is a harmonic frequency and therefore the frequency of the external pumping source is considerably lower than that normally required.

The present invention contemplates the use of ferrite type materials and makes use in a novel way of a known property of ferrite materials. The non-linear reactance in ferrite materials is attributed to the "gyromagnetic" effect or "gyromagnetic resonance" within the material. The term gyromagnetic is explained as describing a property arising from the existence of spin in the electrons which produce the magnetic moments in the material. This property is exhibited in gross when a strong unidirectional magnetic field is applied to the material so as to largely align the magnetic poles in a given direction. If an orthogonally-related alternating field is simultaneously applied, the axis of polarization tends to precess in a manner similar to the precession of a gyroscope under the influence of a torque directed at right angles to spin. Assuming that the orthogonally-related field operates primarily in a single direction in said field, the precession follows a circular or approximately elliptical path when viewed in a plane transverse to the unperturbed axis. If the ferrite material is substantially saturated by the D.C. field the polarization vector is of constant length under perturbation so that the tip of the polarization vector always lies on a spherical surface. If this spherical surface is viewed towards the plane containing the unperturbed vector and parallel to the perturbing field, it will be observed that the usual non-circular perturbation occasions a change in the length of the component of the magnetization measured along the unidirectional field. In other words, as viewed from the side, the ellipse-like path which is traced by the tip of the polarization vector is seen to be turned down at two ends and high in the center. If one traces the perturbation arising from a single complete cycle of transversely applied field once around the elliptical path followed by the precessing polarization vector, the component of the magnetization vector parallel to the polarizing magnetic field goes through two minima and two maxima thus producing a harmonic of the perturbing frequency polarized in the direction of the polarizing field.

The foregoing explanation of harmonic generation readily accounts for the generation of the second harmonic. In fact, however, higher than second order harmonics have been generated with high efficiency in ferrite type materials. An article describing such harmonic generation appeared in the Proceedings of the I.R.E. of May 1957, pages 643 to 646. The article was entitled "Microwave Frequency Doubling from 9 to 18 kmc. in Ferrites" and was written by J. L. Melchor, W. P. Ayres and P. S. Vartanian.

It is an additional object of the present invention to provide a new and improved parametric amplifier wherein the effective pumping frequency is a harmonic frequency of an initial pumping frequency.

It is another object of the present invention to use the foregoing harmonic generation property of a non-linear ferrite in a parametric amplifier to permit the use of an initial source of pumping frequency of relatively low frequency.

These and other objects of the present invention are achieved in accordance with the present invention by employing a single non-linear inductance in a parametric amplifier not only in the conventional synthesis of the heterodyne difference terms between the pumping energy and signal energy and between the pumping energy and idling energy, but also in simultaneously generating a harmonic of the auxiliary source used for supplying the pumping energy. In an illustrative embodiment of the present invention, a non-linear ferrite element is coupled in circuit with a multi-resonant system exhibiting resonance at the pumping frequency, at an integral harmonic of the pumping frequency, at the idling frequency and at the signal frequency, the harmonic of the pumping frequency being made equal to the sum of the signal and idling frequencies. A saturating magnetic field for the ferrite is then applied oriented transversely to the field created by the source of pumping energy to facilitate the creation of a harmonic of the pumping energy, polarized in the direction of the saturating field. This harmonic is then used jointly with the idling and signal waves, both lying in a plane transverse thereto, the latter two also being mutually perpendicular to one another as well, for parametric amplification.

The features of the invention which are believed to be novel are set forth with particularity in the appended claims. The invention itself, however, both as to its organization and method of operation, together with further objects and advantages thereof, may best be understood by reference to the following description when taken in connection with the drawings, wherein:

Figures 1, 2, 3:
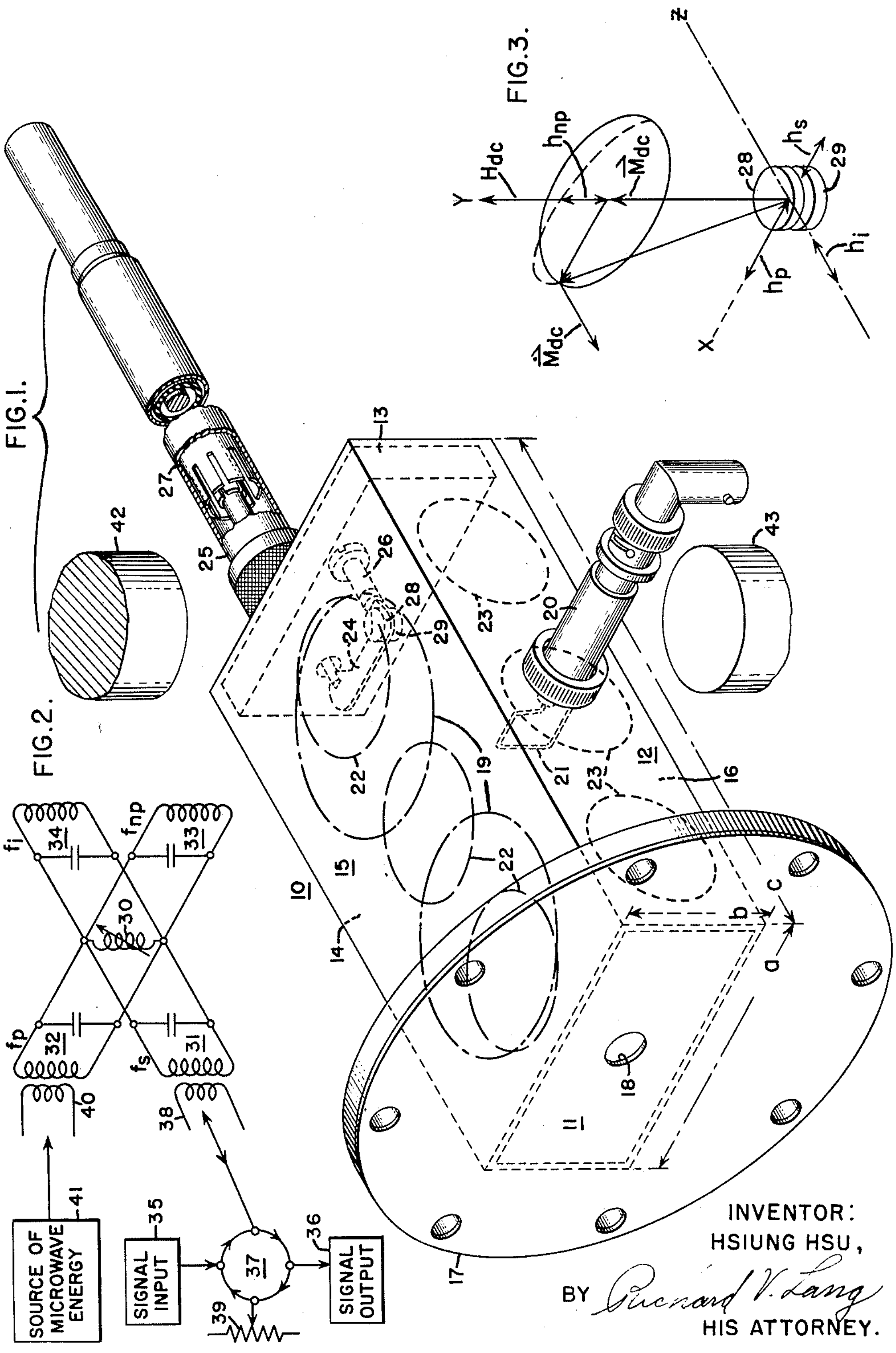
FIGURE 1 is a structural drawing illustrating a parametric amplifier built in accordance with the present invention and employing a resonant cavity, resonant at three selected frequencies, and containing a strip line resonant at a fourth selected frequency.
FIGURE 2 is an equivalent circuit drawing representing the mode of connection of applicant's novel parametric amplifier for utilization.
FIGURE 3 is an explanatory vector diagram illustrating the significant magnetization and field vectors which enter into the operation of applicant's novel circuit.

Referring now to FIGURES 1 and 2, there is shown a first embodiment of the invention wherein a space resonant system comprising a resonant cavity and a resonant strip line are employed in conjunction with a single ferrite element to achieve amplification of a high frequency signal. In the specific example under study, amplification of a signal of 9 kmc. is contemplated with a pump operating at a frequency of 7.75 kmc. and an idling circuit tuned to 6.50 kmc.

The resonant cavity is shown at 10 in FIGURE 1. It takes the form of a rectangular parallelopiped having three non-equal dimensions *a*, *b* and *c* measured in the X, Y and Z directions respectively as indicated in the coordinate axes shown in FIGURE 3. The dimensions *a*, *b* and *c*, for reasons which will soon be developed, are arranged to support a $TE_{103}$ mode at the signal frequency at 9 kmc., a $TE_{102}$ mode at 7.75 kmc., and a $TE_{013}$ mode at 15.50 kmcs.

The resonant cavity is provided with external connections to the faces 11, 12 and 13. Assuming that the *c* dimension is greatest and that the *b* dimension is least, the surfaces 11 and 13 will be referred to as the end walls of the cavity, while the surface 12 and its opposing surface 14 are referred to the side walls of the cavity. The remaining surfaces 15 and 16 will be denoted the top and bottom walls of the cavity, respectively.

The cavity 10 is flanged at 17 adjacent the end wall 11 for connection to a wave guide furnishing pumping energy. A small aperture 18 is placed at the center of the end wall 11 for coupling energy into the interior of the cavity, and in particular to facilitate excitation of the $TE_{102}$ mode of the cavity. The dash-dotted curves 19 drawn in a plane parallel to the top and bottom surfaces of the cavity illustrate the magnetic lines of the $TE_{102}$ mode.

Signal connection is made to the face 12 by means of a coaxial line 20 inserted through the side wall 12 of the cavity and terminated with a rotatable coupling loop 21. The use of the rotatable loop permits control of the degree of coupling and thereby the impedance presented to the signal source. The signal coupling 20 is centrally placed in the side wall 12 to facilitate energy exchange and excitation of the $TE_{103}$ mode of the cavity which occurs at signal frequency. The $TE_{103}$ mode is illustrated in dashed lines at 22. The magnetic lines indicated at 22 are drawn in a plane parallel to the planes of the top and bottom walls 15 and 16.

The third mode of resonance of the cavity at a selected frequency is the $TE_{013}$ mode at a harmonic of the frequency of the pumping source, i.e. 15.50 kmc. It is illustrated at 23 by three dotted loops illustrating magnetic lines, drawn parallel to the side walls 12 and 14. As indicated earlier, excitation of this mode occurs by the ferrite element used for parametric amplification.

The strip line providing the fourth resonant element in the system is shown at 24. It is installed in the end wall 13 of the cavity. As illustrated, it comprises a flattened conductor, connected to the inner conductor of a coaxial line 25 introduced into the resonant cavity at a position displaced from the center of the face 13 in the X direction. The broad surface of strip line conductor is oriented in a plane parallel to the top and bottom surfaces 15 and 16. The strip line is also parallel to the end wall 13, extending from the point of entry in a (—X) direction until it reaches the center of the end wall 13. The strip line is kept close to the end wall 13. At the center point of the end wall 13, the strip line is grounded as shown at 26. The coaxial line 25, which extends externally from the cavity 10, is provided with an adjustable tuning stub 27 for tuning the strip line to resonance at the idling frequency 6.5 kmc. It may be noted that the grounded end 26 of the strip line 24 exhibits a current maximum and creates a localized magnetic field which is parallel to the plane of the top and bottom surfaces of the cavity and extending generally in a Z direction.

The non-linear element of the foregoing amplifier is of a polycrystalline ferrite type material taking the form of two thin flat disks 28 and 29, whose diameters are approximately equal to the width of the strip line and which are applied respectively above and below the strip line at a position in space opposite to the center of the end wall 13. Since the strip line 24 is kept at a relatively small distance from the end wall 13, it may be seen that the ferrite is located in close proximity to the end wall 13 and oppositely of the center of the end wall 13. In other words, it is placed equidistant from the top and bottom walls 15 and 16 and the side walls 12 and 14. By this orientation it is seen that the ferrite is placed in a region of maximum field or maximum coupling to each of the four resonant modes of the composite system.

The waveguide is further provided with means for creation of a strong magnetic field in the Y direction. These means include the pole pieces shown at 42 and 43 designed to create a saturating field in the ferrite elements 27, 28 in the Y direction. In the drawing, for ease in illustration, the pole pieces have been pulled away from their normal operating position in close proximity to the cavity.

The "ferrite" (28 and 29) is preferably of a ferromagnetic material having a very narrow magnetic resonance line and having a low dielectric loss at the intended frequency of operation. In general, the pumping power requirements climb rather sharply with an increase in width of the magnetic resonance line. This factor tends to favor the use of ferrites in the single crystalline form such as single crystalline yttrium iron garnet $3Y_2O_3.5Fe_2O_3$, which has a structure of the common mineral garnet, or manganese ferrite $MnO_2.Fe_2O_3$ in single crystalline form. It should be observed that these single crystals often are hard to obtain in larger sizes. Hence, one may use polycrystalline materials, such as those of the yttrium ferrite, or magnesium alumina ferrite where larger size is required. These latter materials require considerably higher pumping powers, but can be readily obtained without size limitation.

The type of material employed also affects the size of the magnetic field required. In general, a field of several thousand oersteds is required (typically three to five thousand) with a stability of preferably one part in a thousand. The stability requirements are relaxed somewhat as the line width of the ferrite material increases. It should be realized that many new materials are now being studied for use at microwave frequencies that may be applicable to the present invention. The requisite properties of such materials have been indicated for this reason.

The foregoing parts, including the cavity having three modes of resonance, the strip line having a fourth resonance, and the non-linear "ferrite" form the central elements of applicant's parametric amplifier. The manner in which these parts may be connected for operation as an amplifier is shown in FIGURE 2. In this FIGURE, the non-linear ferrite is represented as a variable inductance 30 in shunt with which there is connected four parallel resonant circuits 31, 32, 33 and 34. The resonant circuit 31 is tuned to be resonant at the signal frequency as indicated by the legend $f_s$. The resonant circuit 32 is tuned to be resonant to the pumping frequency as indicated by the legend $f_p$. The resonant circuit 33 is tuned to be resonant to an integral multiple of the pumping frequency as indicated by the legend $f_{np}$. The resonant circuit 34 is tuned to be resonant at the idling frequency as indicated by the legend $f_i$.

The signal input 34 and the signal output 36 are coupled through a circulator 37 and a coupling element 38 to the signal resonant circuit 31. The circulator 37 is a device having the property of delivering energy only to the next terminal to clockwise (as viewed in the drawing). In this manner, signal voltages at the input 35 are coupled to a first terminal of the circulator and delivered to the coupling element 38 for application to a parametric amplifier. In the parametric amplifier, the signal is amplified and returned to the coupling element 38. The return energy of signal frequency is then applied to the second terminal of the circulator and proceeds clockwise as illustrated in FIGURE 2 to the third terminal to which the signal output 36 is connected. If the signal output is properly matched, very little energy will be reflected back to continue its clockwise progression around the circulator. However to prevent any further energy from completing the circuit about the circulator 37 a dummy load 39 properly matched to prevent reflection is coupled to the fourth and last terminal of the circulator. These connections thus permit stable amplification of the signal while using a single signal connection to the resonant system.

The pumping energy is applied by means of a coupling element 40 from a source of microwave energy 41. The source of microwave energy 41 is usually of moderately high power level, preferably delivering power on the order of several killowatts of peak power with a pulsed duty cycle to avoid overheating of the system when a polycrystalline type of ferrite is employed.

The field relations existing in the ferrite elements 28 and 29 required for synthesis of the harmonic of the pumping energy and for parametric amlpification are best illustrated in FIGURE 3. Here a set of coordinate axes oriented like those in FIGURE 1 has been employed. The fields and magnetization are of the ferrite element itself. The polarizing field $H_{dc}$ is shown extending in the Y direction and producing a magnetization $M_{dc}$ also extending in the Y direction. At right angles thereto and extending in the X direction is the pumping field $h_p$. The pumping field $h_p$ acting in the X direction causes the magnetization vector $M_{dc}$ to precess. Since $H_{dc}$ is sufficiently strong to cause saturation of the magnetic material, the magnetization vector does not change in length as it is perturbed. If the $h_p$ is circularly polarized, the path of precession will be circular and the Y component of the vector $M_{dc}$ will be constant. If, however, the circular polarization of $h_p$ is disturbed as by the illustrated placing of the ferrite element in proximity to the end wall 13, the X and Z field components are no longer equal. When these components are no longer equal, the path of the precessing polarization vector as viewed in a plane parallel to the XZ plane is approximately elliptical, and as viewed from a side elevation (perpendicular to the XZ plane) is no longer flat. This is of course true because the tip of the polarization vector $M_{dc}$ is of constant length and effectively traces out a spherical surface. The change in flatness occurring in the Y direction corresponds to a wave of double the frequency of precession ($h_{2p}$) polarized in the Y direction. The harmonic wave thus created is oriented for effective coupling to the $TE_{013}$ mode of the cavity, which coupling greately intensifies the harmonic term and aids in establishing a substantial harmonic field in the ferrite.

Parametric amplification is accomplished by the interaction of the magnetization introduced by the harmonic wave $h_{2p}$ with the signal and idling fields. In FIGURE 3, the signal field $h_s$ is illustrated acting in the X direction in the region of the ferrite and the idling field $h_i$, from the strip line 24, is shown acting in the Z direction. Thus the fields $h_i$ and $h_s$ are mutually perpendicular to one another and lie in a plane transverse to the magnetization ($M_{2p}$) resulting from the harmonic field.

As outlined earlier, parametric amplification occurs with the mixing of two components, (pumping and signal) to form a difference term, coincidence in frequency with the third component (the idling frequency); and the subsequent mixing of two components (pumping and idling) to form a difference term coincident with the first component (the signal frequency). The field relationships as illustrated in FIGURE 3 permits this combination. The change in magnetization $\dot{\vec{M}}_{2p}$ resulting from the interaction between the magnetization $\vec{M}_{2p}$ at harmonic frequency and the signal field $\vec{h}_s$ equals:

$$\dot{\vec{M}}_{2p} = \gamma \, (\vec{M}_{2p} \times \vec{h}_s)$$

where $\gamma$ is the gyromagnetic ration and where the quantity $\dot{\vec{M}}_{2p}$ is a vector quantity directed orthogonally to $\vec{M}_{2p}$ and $\vec{h}_s$, i.e., in the Z direction, thus intensifying the idling field also acting in the Z direction. Similarly, the effect of interaction between the magnetization due to the idling field and the pumping field results in a cross product, directed in the X direction to reinforce the magnetization due to the X directed signal field. Thus, by the foregoing field relationships and frequency selective action of the resonant circuits which establish such field relationships for the desired heterodyne terms, the conditions for parametric amplification are established.

In practice, the gain of the system can be quite high since all the elements entering into the system may be of low loss. Ferrite materials of low loss are well known and readily available. The existence of the feedback property in the system makes it possible to increase the gain if desired until the system is oscillatory.

As indicated earlier, the pumping power required may be on the order of a kilowatt of peak power when a polycrystalline ferrite material is employed. This depends to some extent upon the efficiency of harmonic generation and upon the type of ferrite material employed. Harmonic generation efficiency in excess of 50% has been observed and it is felt that the figure may increase to a much higher figure. The use of mono-crystalline ferrite materials also reduces the required pumping power. If the latter materials are employed, the pumping power may be reduced to a few watts.

Applicant's invention is particularly advantageous in its use of a single element both for harmonic generation and for parametric amplification. The qualities which make for efficient harmonic generation are also those which lead to improved parametric amplification. Furthermore, use of the same element not only efficiently performs both functions, but results in considerable saving in costly and bulky equipment as for instance the equipment required for supplying the polarizing fields and for establishing the resonant fields themselves.

While particular embodiments of the invention have been shown and described it should be understood that the invention is not limited thereto and that it is intended in the appended claims to claim all such variations as fall within a true spirit of the present invention.

What I claim as new and desire to secure by Letters Patent of the United States is:

1. In a parametric amplifier, a gyromagnetic ferromagnetic material disposed in a polarizing magnetic field for establishing gyromagnetic resonance, means for applying a pumping field thereto having a substantial component orthogonal to said polarizing field of sufficient intensity to generate harmonics of said pumping field therein oriented in the direction of said polarizing fields, resonant means tuned to the second harmonic coupled to said material for selecting and intensifying said second harmonic, idling and signal circuit means coupled with said material in a plane orthogonal to said second harmonic for achieving parametric amplification in cooperation with said selected harmonic field the frequency of said selected harmonic being equal to the sum of the idling and signal frequencies.

2. A negative resistance device comprising a member of insulative ferromagnetic material which exhibits gyromagnetic resonance, means for establishing a unidirectional saturating magnetic field in said member for establishing gyromagnetic resonance therein with the magnetization thereof in a predetermined direction, a resonant system including a cavity and providing with said ferrite a plurality of resonant modes at the frequency $f_1$, $f_s$, $f_p$, and a second harmonic of said $f_p$, said harmonic frequency ($f_{2p}$) being equal to the sum of the frequencies $f_1$ and $f_s$, said modes at $f_1$ and $f_s$ having mutually perpendicular magnetic field components and said modes at $f_1$ and $f_s$ having magnetic field components lying in a common plane perpendicular to the direction of said mode at $f_{2p}$ at a predetermined location in said cavity, means for supporting said member in said cavity at said predetermined location and aligning said unidirectional field with a field direction of said harmonic mode at said location, signal energy exchanging means coupled to said system for operation at said mode at $f_s$, means for supplying wave energy at frequency $f_p$ to said system for excitation of said $f_p$ mode for causing the vector of magnetization from said saturating field to precess and thus create said harmonic mode at $f_{2p}$ whose field has a component in said predetermined direction, the field of said mode at frequency $f_1$, which arises upon excitation of said system, combining with the orthogonally related magnetization vector due to the field of said harmonic mode at frequency $f_{2p}$ to create a change in the resulting magnetization vector varying at a rate equal to the signal frequency ($f_s$) and oriented to reinforce said mode at $f_s$ by which energy is transferred from said energy supplying means to said signal energy exchanging means.

3. A negative resistance device as set forth in claim 2 wherein said resonant system is formed by said cavity supporting three of said four resonant modes and a strip line supporting said fourth mode.

4. A negative resistance device as set forth in claim 2 wherein said resonant system comprises said cavity resonant at $f_p$ and $f_{2p}$ and one of said frequencies $f_1$ and $f_s$, and a strip line resonant at the remaining one of said frequencies.

5. A negative resistance device as set forth in claim 2 wherein said resonant system comprises said cavity resonant at $f_p$ and $f_{2p}$ in mutually orthogonal modes, and at one of said frequencies $f_1$ and $f_s$ in a third mode orthogonal to $f_{2p}$, and a strip line resonant at the remaining frequency arranged to create a field on its surface orthogonal to both the fields of $f_{2p}$ and said third mode.

References Cited in the file of this patent

UNITED STATES PATENTS

| | | |
|---|---|---|
| 1,884,844 | Peterson | Oct. 25, 1932 |
| 1,884,845 | Peterson | Oct. 25, 1932 |
| 2,825,765 | Marie | Mar. 4, 1958 |
| 2,868,980 | Southworth | Jan. 13, 1959 |
| 2,922,876 | Ayers et al. | Jan. 26, 1960 |
| 2,962,676 | Marie | Nov. 29, 1960 |
| 2,970,274 | Poole et al. | Jan. 31, 1961 |
| 3,018,443 | Bloom et al. | Jan. 23, 1962 |

FOREIGN PATENTS

| | | |
|---|---|---|
| 563,913 | Belgium | Jan. 31, 1958 |

OTHER REFERENCES

Suhl: Journal of Applied Physics, vol. 28, No. 11, November 1957, pages 1225–1236.

Weiss: Physical Review, vol. 107, No. 1, July 1, 1957, page 317.

Chang et al., and Poole et al.: Proceedings of the IRE, vol. 46, No. 7, July 1958, pages 1383–1396.

Tien et al.: Proceedings of the IRE, April 1958, pages 700–706.

Ayers et al.: "Journal of Applied Physics," February 1956, pages 188–189.

Manley et al.: "Proceedings of the IRE," July 1956, pages 904–913.

"Quantum Electronics," Edited by Townes, Columbia University Press, New York 1960, pages 306–313.

Poole et al.: "IRE Wescon Convention Record 1957—Part 3" pages 170–174.

Damon et al.: "IRE Transactions on Microwave Theory and Techniques," January 1960, pages 4–9.